US012794080B2

(12) United States Patent
Lee et al.

(10) Patent No.: US 12,794,080 B2
(45) Date of Patent: Nov. 10, 2026

(54) UNIT CELL FOR SECONDARY BATTERY INCLUDING SEPARATOR WITH INSULATING COATING LAYER AND MANUFACTURING METHOD THEREOF

(71) Applicant: LG Energy Solution, Ltd., Seoul (KR)

(72) Inventors: Jiwon Lee, Daejeon (KR); Kwangjin Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 697 days.

(21) Appl. No.: 18/030,906

(22) PCT Filed: Jan. 7, 2022

(86) PCT No.: PCT/KR2022/000335
§ 371 (c)(1),
(2) Date: Apr. 7, 2023

(87) PCT Pub. No.: WO2022/149921
PCT Pub. Date: Jul. 14, 2022

(65) Prior Publication Data

US 2023/0378605 A1 Nov. 23, 2023

(30) Foreign Application Priority Data

Jan. 8, 2021 (KR) ........................ 10-2021-0002664

(51) Int. Cl.
*H01M 50/446* (2021.01)
*H01M 4/13* (2010.01)
(Continued)

(52) U.S. Cl.
CPC ........... *H01M 50/446* (2021.01); *H01M 4/13* (2013.01); *H01M 10/052* (2013.01);
(Continued)

(58) Field of Classification Search
CPC .......... H01M 4/13; H01M 4/46; H01M 4/446; H01M 4/449
See application file for complete search history.

(56) References Cited

U.S. PATENT DOCUMENTS 11,462,772 B2 * 10/2022 Jo ....................... H01M 50/461
2007/0154790 A1 7/2007 Jeung et al.
(Continued)

FOREIGN PATENT DOCUMENTS

CN 103928715 A * 7/2014 ........ H01M 10/0525
CN 108389999 A 8/2018
(Continued)

OTHER PUBLICATIONS

Machine translation of JP 2017-033746 (no date) (Year: 0000).*
(Continued)

*Primary Examiner* — Amanda C. Walke
(74) *Attorney, Agent, or Firm* — Lerner David LLP

(57) ABSTRACT

A unit cell for a secondary battery according to one embodiment of the present disclosure includes an electrode plate on which a tab is formed, and a separator, wherein the separator includes a first coating part in which an organic/inorganic composite porous coating layer is formed on at least one surface of a base substrate, and a second coating part on which an insulating coating layer is formed.

12 Claims, 5 Drawing Sheets

(51) Int. Cl.
*H01M 10/052* (2010.01)
*H01M 50/426* (2021.01)
*H01M 50/46* (2021.01)
*H01M 50/54* (2021.01)

(52) U.S. Cl.
CPC ......... *H01M 50/426* (2021.01); *H01M 50/46* (2021.01); *H01M 50/54* (2021.01)

(56) References Cited

U.S. PATENT DOCUMENTS

| | | | |
|---|---|---|---|
| 2015/0171396 | A1 | 6/2015 | Okuno |
| 2017/0069895 | A1 | 3/2017 | Okuno |
| 2018/0145376 | A1 | 5/2018 | Jo et al. |
| 2020/0350540 | A1 | 11/2020 | Han et al. |
| 2022/0311057 | A1 | 9/2022 | Lee et al. |

FOREIGN PATENT DOCUMENTS

| | | | | |
|---|---|---|---|---|
| JP | 2002-170552 | A | | 6/2002 |
| JP | 2011-204585 | A | | 10/2011 |
| JP | 2011216403 | A | | 10/2011 |
| JP | 2017033746 | A | * | 2/2017 |
| JP | 2020-530185 | A | | 10/2020 |
| KR | 20070073169 | A | | 7/2007 |
| KR | 20140009037 | A | | 1/2014 |
| KR | 20140135956 | A | | 11/2014 |
| KR | 20150098445 | A | | 8/2015 |
| KR | 20160051664 | A | | 5/2016 |
| KR | 20160109408 | A | | 9/2016 |
| KR | 20170111721 | A | | 10/2017 |
| KR | 20180058370 | A | | 6/2018 |
| KR | 20190057941 | A | | 5/2019 |
| KR | 10-2124105 | B1 | | 6/2020 |
| KR | 20200143979 | A | | 12/2020 |
| WO | 2020-256281 | A1 | | 12/2020 |

OTHER PUBLICATIONS

Machine translation of CN 108389999 (no date) (Year: 0000).*
Machine translation of CN 103928715 (no date) (Year: 0000).*
Machine translation of KR 102124105 (no date) (Year: 0000).*
International Search Report for Application No. PCT/KR2022/000335 mailed Apr. 25, 2022. 3 pages.
EESR for Application No. 22736898.2 dated Apr. 3, 2024. 9pgs.

* cited by examiner

【FIG. 1】
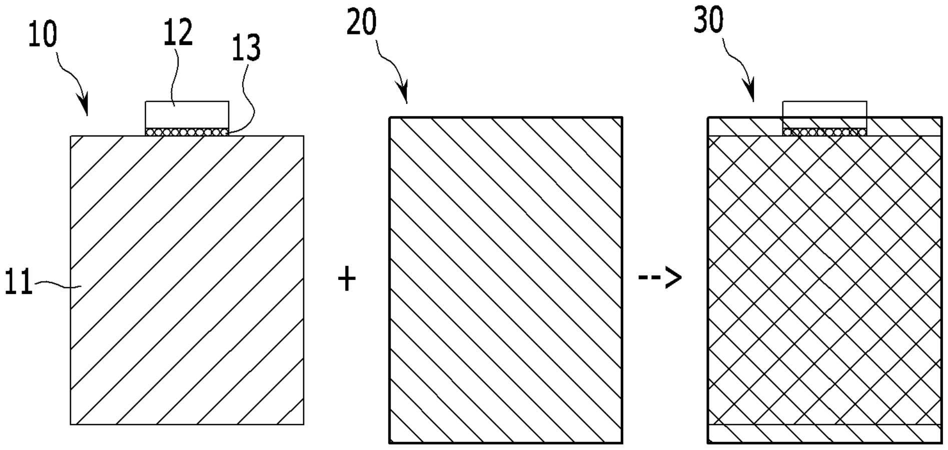
PRIOR ART
【FIG. 2】
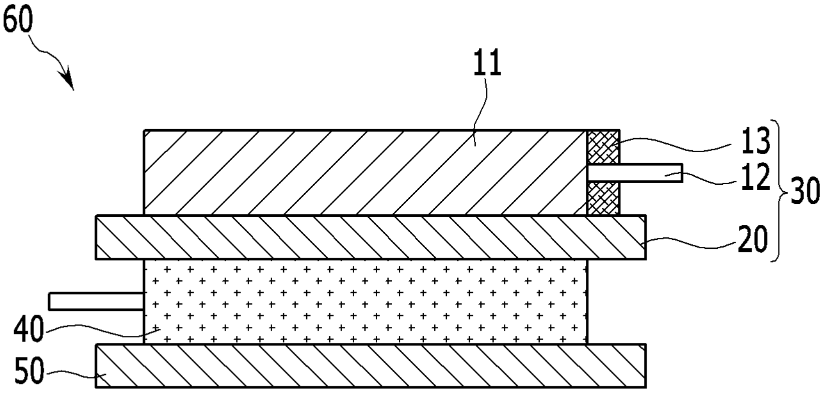
PRIOR ART

【FIG. 3】
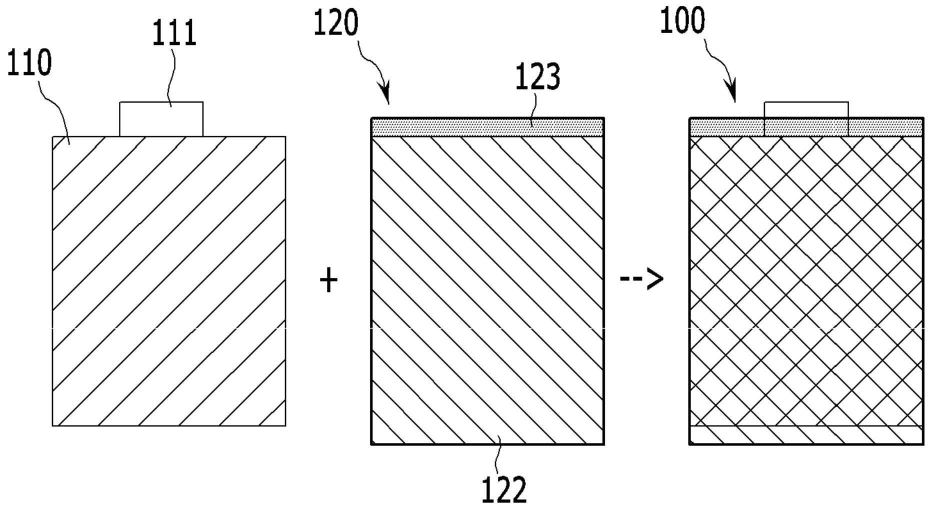
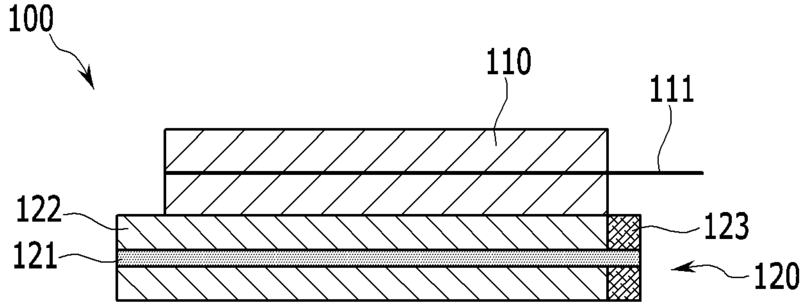

【FIG. 4】
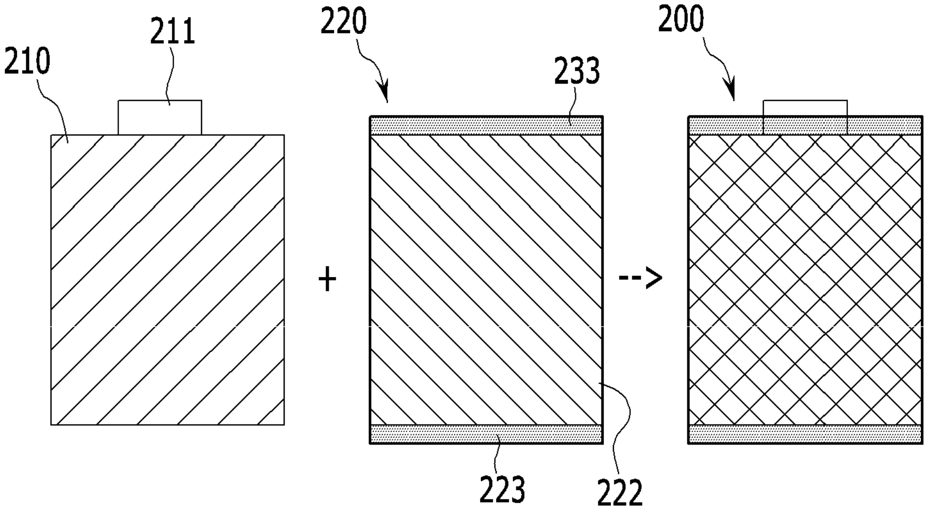
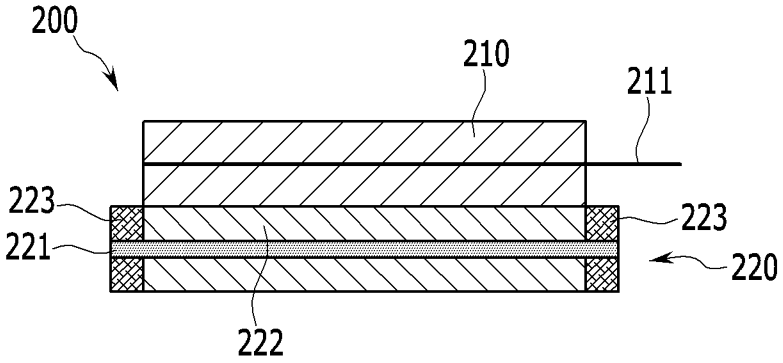

【FIG. 5】
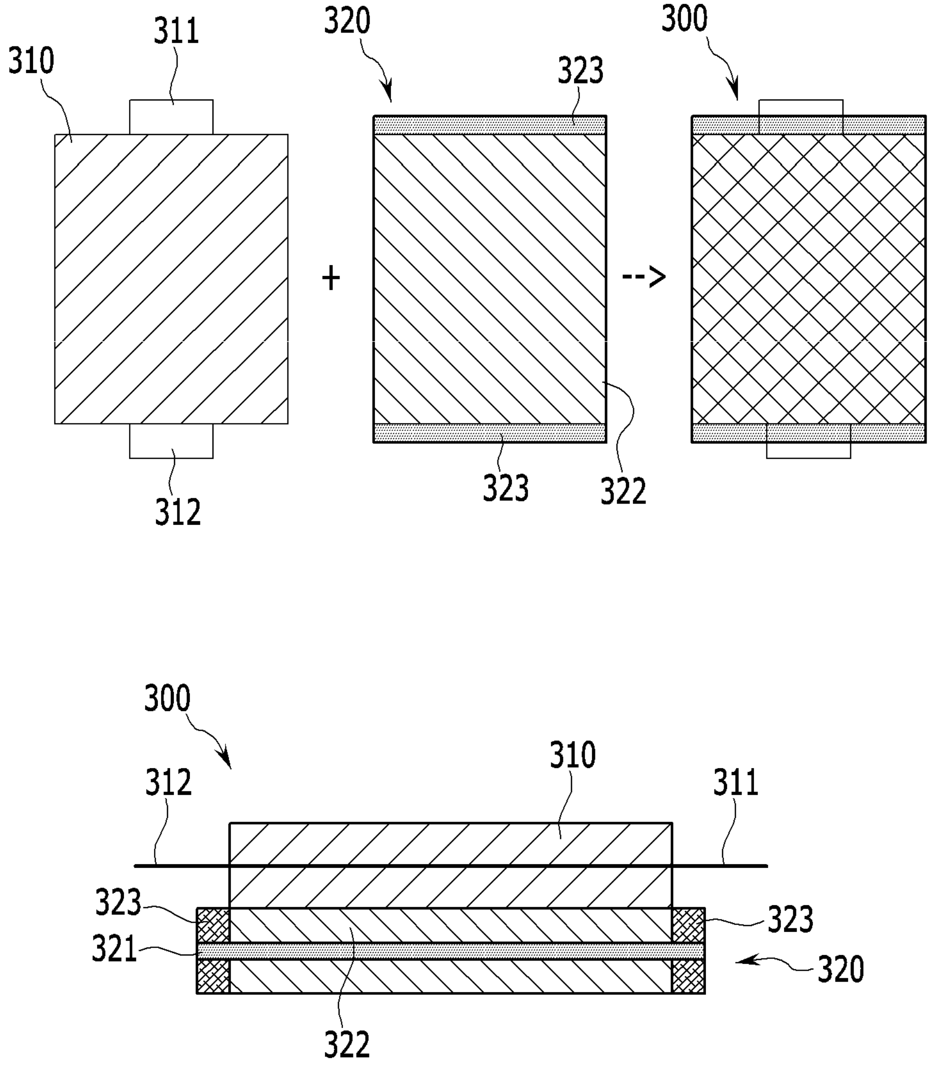

【FIG. 6】
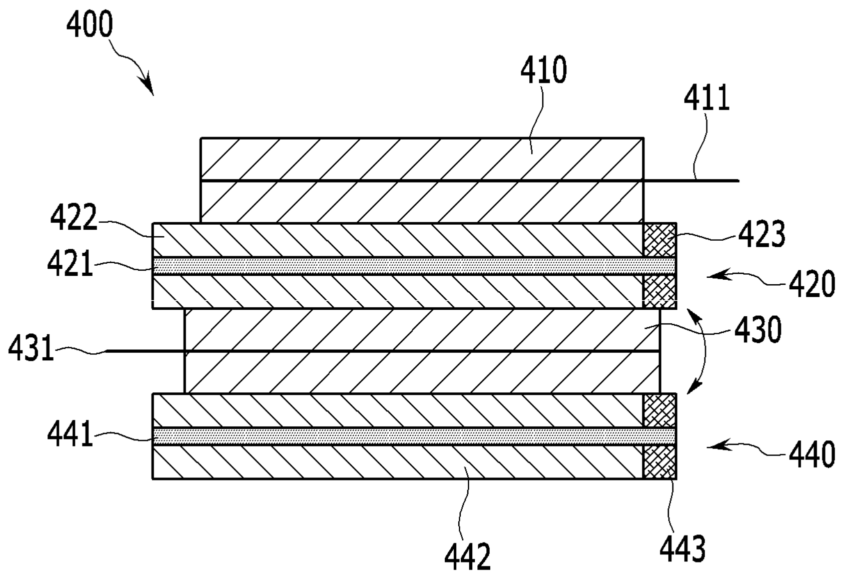
【FIG. 7】
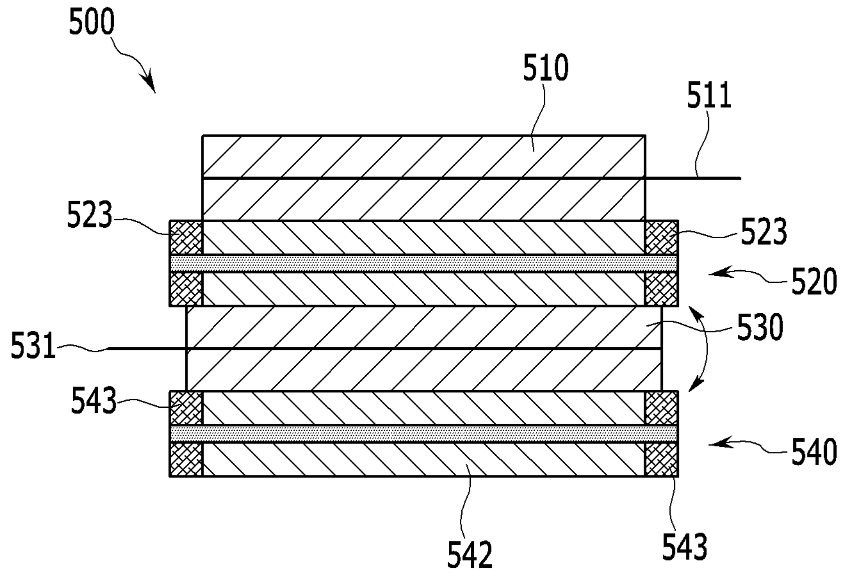

UNIT CELL FOR SECONDARY BATTERY INCLUDING SEPARATOR WITH INSULATING COATING LAYER AND MANUFACTURING METHOD THEREOF

CROSS-REFERENCE TO RELATED APPLICATIONS

This application is a national phase entry under 35 U.S.C. § 371 of International Application No. PCT/KR2022/000335 filed Jan. 7, 2022, which claims the benefit of Korean Patent Application No. 10-2021-0002664 filed on Jan. 8, 2021 with the Korean Intellectual Property Office, the contents of which are incorporated herein by reference in their entireties.

TECHNICAL FIELD

The present disclosure relates to a unit cell for secondary battery including a separator on which an insulating coating layer is formed, and a method of manufacturing the same.

BACKGROUND

Due to the rapid increase in the use of fossil fuels, the demand for the use of alternative energy or clean energy is increasing, and as part thereof, the fields that are being studied most actively are the fields of power generation and power storage using electrochemistry.

At present, a secondary battery is a representative example of an electrochemical device that utilizes such electrochemical energy, and the range of use thereof tends to be gradually expanding.

Recently, along with the increase of the technological development and demand for mobile devices such as portable computers, portable phones, and cameras, the demand for secondary batteries has also sharply increased as an energy source. Among such secondary batteries is a lithium secondary battery exhibiting high charge/discharge characteristics and lifetime characteristics and being environmentally friendly, in which much research has been carried out and which is now commercialized and widely used.

Generally, the secondary battery is manufactured by impregnating a non-aqueous electrolyte in electrode assembly comprising a positive electrode, a negative electrode, and a porous separator.

At this time, the electrodes such as the positive electrode and the negative electrode are coated with the electrode active material in order to prevent the active material from protruding, and then an insulating solution is coated onto the electrode tab portion or the insulating treatment to which the insulating tape is attached is performed.

Such an insulation treatment is a process that can prevent the active material from protruding and reduce Li plating and the like, and contributes to improving the safety of the cell.

In particular, the ESS (Energy Storage System) electrode produces a positive electrode by simultaneously coating the insulating coating solution during the insulating treatment of the active material slurry, and forms a unit cell for a secondary battery in the form of stacking it with a separator, This is shown in FIGS. 1 and 2.

First, referring to FIG. 1, when coating the positive electrode slurry, the tab portion is coated with an insulating coating solution, thereby forming a positive electrode 10 to which the insulating coating layer 13 is applied at the boundary between the active material layer 11 and the tab 12, which electrode can be stacked with a separator 20 to manufacture the unit cell 30.

In addition, referring to FIG. 1 together with FIG. 2, the unit cell 30 including the positive electrode 10 and the separator 20 on which the insulating coating layer 13 is formed on the tab 12 portion prepared in this way, may form a new unit cell 60 in the form of being stacked together with a negative electrode 40 and an additional separator 50.

However, the electrode having such configuration is hard to match the alignment of the insulating coating solution when the electrode slurry and the insulating coating solution are simultaneously coated, and in this process, a large loss of electrode slurry occurs.

Moreover, even when forming a unit cell for a secondary battery, the separator which is a polymer base material, frequently folds when the electrode and the separator are stacked, which poses a threat to the safety of the secondary battery.

Therefore, there is an urgent need to develop a technology that can secure the safety of the secondary battery by forming an insulating coating layer while solving these problems.

DETAILED DESCRIPTION OF THE INVENTION

Technical Problem

The present disclosure has been designed to solve the above-mentioned problems and other technical problems that have yet to be resolved.

Specifically, it is an object of the present disclosure to provide a unit cell for secondary battery that not only solve a problem that it is difficult to match the alignment when applying an insulating coating solution, and thus electrode loss occurs, while improving the safety of secondary battery by applying an insulating coating layer, but also can prevent even the folding issue of the separator, and a method of manufacturing the same.

Technical Solution

In order to achieve the above object, according to one aspect of the present disclosure, there is provided a unit cell for secondary battery, comprising: an electrode plate on which a tab is formed, and a separator, wherein the separator comprises a first coating part in which organic/inorganic composite porous coating layer is formed on at least one surface of a base substrate, and a second coating part on which an insulating coating layer is formed.

In one specific embodiment, the tab is formed on one side of the electrode plate, the second coating part is formed on one end of the separator at the portion overlapping with the tab based on the formation direction of the tab, the first coating part is formed parallel to the second coating part at the remaining portion, and the electrode may be stacked on the separator so that the tab is located on the second coating part of the separator.

In one specific embodiment, the tab is formed one side or both sides of the electrode plate, the second coating part is formed on one end of the separator at the portion overlapping with the tab based on the formation direction of the tab and at the other end of the separator corresponding thereto, the first coating part is formed parallel to the second coating part at the remaining portion, and the electrode is stacked on the separator so that the tab is located on the second coating part at one end or both ends.

Meanwhile, the electrode plate may be a positive electrode plate.

In this case, the cell for secondary battery further comprises a negative electrode plate, and the separator may be interposed between the positive electrode plate and the negative electrode plate.

At this time, the negative electrode plate may be larger in size than the positive electrode plate on four sides.

Furthermore, the unit cell for secondary battery further comprises an additional separator including a first coating part and a second coating part, similarly to the separator, and the additional separator may be stacked on the other surface of the positive electrode plate or the negative electrode plate on which the separator does not face.

At this time, the second coating part of the separator and the second coating part of the additional separator may be joined to each other.

In one specific embodiment, the insulating coating layer may be a polymer coating layer containing a PVdF-based material.

Meanwhile, according to another aspect of the present disclosure, there is provided an electrode assembly comprising the unit cell for secondary battery, and a lithium secondary battery comprising the electrode assembly, and a lithium salt non-aqueous electrolyte.

According to yet another aspect of the present disclosure, there is provided a method of manufacturing the unit cell for secondary battery, the method comprising the steps of:

(a) preparing an electrode plate on which a tab is formed;
(b) forming a first coating part of an organic/inorganic composite porous coating layer and a second coating part of an insulating coating layer on at least one surface of the base substrate to prepare a separator; and
(c) stacking the electrode and the separator.

The first coating part and the second coating part may be formed by simultaneous coating.

BRIEF DESCRIPTION OF THE DRAWINGS

FIG. 1 is a schematic diagram of a manufacturing process of a conventional unit cell for secondary battery;

FIG. 2 is a cross-sectional view of the unit cell of FIG. 1;

FIG. 3 is a schematic diagram and a cross-sectional view of a manufacturing process of a unit cell for secondary battery according to an embodiment of the present disclosure;

FIG. 4 is a schematic diagram and a cross-sectional view of a manufacturing process of a unit cell for secondary battery according to another embodiment of the present disclosure;

FIG. 5 is a schematic diagram and a cross-sectional view of a manufacturing process of a unit cell for secondary battery according to another embodiment of the present disclosure;

FIG. 6 is a cross-sectional view of a unit cell for secondary battery according to another embodiment of the present disclosure; and FIG. 7 is a cross-sectional view of a unit cell for secondary battery according to another embodiment of the present disclosure.

DETAILED DESCRIPTION OF THE EMBODIMENTS

Hereinafter, the present disclosure will be described in more detail for a better understanding of the present disclosure.

Terms or words used in the present specification and claims should not be construed as limited to ordinary or dictionary terms, and the present disclosure should be construed with meanings and concepts that are consistent with the technical idea of the present disclosure based on the principle that the inventors may appropriately define concepts of the terms to appropriately describe their own disclosure in the best way.

The technical terms provided herein is merely used for the purpose of describing particular embodiments only, and is not intended to be limiting of the present disclosure. The singular forms "a," "an," and "the" are intended to include the plural forms as well, unless the context clearly indicates otherwise.

The term "including" or "comprising" as used herein specifies a specific feature, integer, step, action, component or a combination thereof, but does not exclude the presence or addition of a different specific feature, integer, step, component and/or a combination thereof.

According to one embodiment of the present disclosure, there is provided a unit cell for secondary battery, comprising:

an electrode plate on which a tab is formed, and a separator, wherein the separator comprises a first coating part in which organic/inorganic composite porous coating layer is formed on at least one surface of a base substrate, and a second coating part on which an insulating coating layer is formed.

Here, 'unit cell' means a partial configuration of an electrode assembly for manufacturing a secondary battery. In other words, it may also mean a separate member for manufacturing an electrode assembly such as a stack-folding type or an L&S (lamination and stack) type, that is, a unit cell such as a bi-cell or a full cell, but in all types of electrode assemblies, it also means a part forming the electrode assembly. Therefore, when the first coating part of the organic/inorganic composite porous coating layer and the second coating part of the insulating coating layer are formed on at least one separator of the entire electrode assembly, it is included in the scope of the present disclosure.

The formation position of the first coating part and the second coating part are not limited as long as the second coating part is located at a position where a tab of the electrode plate is formed.

For example, the tab is formed on one side of the electrode plate, the second coating part is formed on one end of the separator at the portion overlapping with the tab based on the formation direction of the tab, the first coating part is formed parallel to the second coating part at the remaining portion, and the electrode is stacked on the separator so that the tab is located on the second coating part of the separator.

Such a structure is schematically shown in FIG. 3.

Referring to FIG. 3, the unit cell 100 for secondary battery has a structure in which an electrode plate 110 having a tab 111 formed on one side and a separator 120 are stacked.

At this time, in the separator 120, the second coating part 123 of the insulating coating layer is formed on the base substrate 121 at one end of the separator at the portion overlapping with the tab 111 based on the direction in which the tab 111 of the electrode is formed, and the first coating part 122 of an organic/inorganic composite porous coating layer is formed parallel to the second coating part 123 on the base substrate 121.

And, when the electrode plate 110 on which the tab 111 is formed and the separator 120 are stacked, the tab 111 is located on the second coating part 123 of the separator 120.

Therefore, even if the insulating coating layer is not formed on the electrode plate 110 on which the tab 111 is formed, the effect of battery cell safety can be ensured by forming the insulating coating layer on the separator 120.

Alternatively, the tab is formed one side or both sides of the electrode plate, the second coating part is formed on one end of the separator at the portion overlapping with the tab based on the formation direction of the tab and at the other end of the separator corresponding thereto, the first coating part is formed parallel to the second coating part at the remaining portion, and the electrode is stacked on the separator so that the tab is located on the second coating part at one end or both ends.

Such a structure is schematically shown in FIGS. 4 and 5.

First, referring to FIG. 4, the unit cell 200 for secondary battery has a structure in which an electrode plate 210 having a tab 211 formed on one side and a separator 220 are stacked.

At this time, in the separator 220, the second coating part 223 of the insulating coating layer is formed on the base material 221 at one end of the separator at the portion overlapping with the tab based on the direction in which the tab 211 is formed, and at the other end of the separator corresponding thereto, and the first coating part 222 of the organic/inorganic composite porous coating layer is formed parallel to the second coating part 223 on the base substrate 221 at the remaining portion.

And, when the electrode plate 210 on which the tab 211 is formed and the separator 220 are stacked, the tab 211 is located on the second coating part 223 at one end of the separator 220.

Further, referring to FIG. 5, the unit cell 300 for secondary battery has a structure in which an electrode plate 310 having tabs 311 and 312 formed on both sides thereof and a separator 320 are stacked.

At this time, in the separator 320, at one end of the separator and the other end of the separator overlapping with the tabs 311 and 312 based on the direction in which the tabs 311 and 312 of the electrode are formed, a second coating part 323 of the insulating coating layer is formed on the base substrate 321, and at the remaining portion, the first coating part 322 of the organic/inorganic composite porous coating layer is formed parallel to the second coating part 323 on the base substrate 321.

Further, when the electrode plate 310 on which the tabs 311 and 312 are formed and the separator 320 are stacked, the tabs 311 and 312 are located on the second coating part 323 at both ends of the separator 320.

Therefore, in either case, not only the second coating part of the insulating coating layer is included at the portion where the separator meets the tab, thereby securing the effect of battery cell safety, but also insulation coating is not performed during slurry coating for manufacturing an electrode plate, thereby preventing loss of electrode slurry due to alignment defect.

At this time, the organic/inorganic composite porous coating layer of the first coating part is the same as the coating layer of the separator conventionally known as SRS, and for example, it may include inorganic particles and a binder polymer.

The inorganic particles may be, for example, high dielectric constant inorganic particles having a dielectric constant of 1 or more, 5 or more, preferably 10 or more, inorganic particles having piezoelectricity, inorganic particles having lithium ion transport ability, or a mixture thereof.

The binder polymer may include, but not limited to, polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyethylene oxide, celluloseacetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, polyimide or a mixture thereof. Any material having the above-mentioned properties can be used alone or in combination.

The second coating part is not limited as long as it includes a material having an insulating property, but may be a polymer coating layer having an insulating property, and for example, it may include a thermoplastic resin, and may include a polyester resin, a polyolefin resin, an ethylene copolymer resin, a polyvinylidene fluoride (PVdF)-based material, and specifically, it may be a polymer coating layer including a PVdF-based material.

Meanwhile, the electrode plate of the unit cell for secondary battery may be a positive electrode plate or a negative electrode plate. However, the problem of the electrode battery cell safety is that mainly the negative electrode is formed larger than the positive electrode, and lithium separated from the negative electrode is formed in a protruding form from the positive electrode, whereby the electrode plate of the unit cell including the separator on which the insulating coating layer is formed may be specifically a positive electrode plate.

Further, the unit cell for secondary battery may not have a form including one electrode plate and one separator, but may be a form including two or more electrode plates or a form including two or more separators.

As described above, when the electrode plate is a positive electrode plate, the unit cell for secondary battery further includes a negative electrode plate, and may have a structure in which the separator is interposed between the positive electrode plate and the negative electrode plate.

On the contrary, when the electrode plate is a negative electrode plate, the unit cell for secondary battery further includes a positive electrode plate, and may have a structure in which the separator is interposed between the positive electrode plate and the negative electrode plate.

At this time, as described above, the negative electrode plate may be larger in size than the positive electrode plate on four sides.

Furthermore, the unit cell for secondary battery further includes an additional separator including a first coating part and a second coating part similarly to the separator, and the additional separator may be stacked on the other surface of the positive electrode plate or the negative electrode plate that the separator does not face.

A schematic diagram having such a structure is shown in FIGS. 6 and 7 below.

First, referring to FIG. 6, the unit cell 400 for secondary battery includes a positive electrode plate 410 having a tab 411 formed on one side, a first coating part 422 of the organic/inorganic composite porous coating layer on the base substrate 421, and a separator 420 on which the second coating part 423 of the insulating coating layer is formed. Furthermore, similarly to the negative electrode plate 430 having a tab 431 formed on one side thereof and the separator 420, an additional separator 440 on which a base substrate 441, a first coating part 442 and a second coating part 443 are formed are included.

Here, the separator 420 is interposed between the positive plate 410 and the negative plate 430, and the additional separator 440 is stacked on the other surface of the negative electrode plate 430 that the separator 420 does not face.

At this time, the second coating part 423 of the separator 420 and the second coating part 443 of the additional separator 440 may be a polymer coating layer as described above, and specifically, it may be a polymer coating layer including a PVdF-based material.

Therefore, the second coating part 423 of the separator 420 and the second coating part 443 of the additional separator 440 are joined to each other by lamination or the like and have excellent adhesive force. Thus, subsequently, problems such as folding of the separator can be minimized, and the battery safety can be further improved.

Referring to FIG. 7, the unit cell 500 for secondary battery includes a positive electrode plate 510 having a tab 511 formed on one side, a separator 520, a negative electrode plate 530 having a tab 531 formed on one side, and a separator 540 having the same structure as the separator 520.

At this time, the difference from FIG. 6 is that the second coating part 523 of the separator 520 and the second coating part 543 of the additional separator 540 are formed at both ends. In this case, the problem of folding the separation membrane can be further effectively solved.

Of course, a combination structure in which a part of the separators have a second coating part formed only on one end, and the second coating part is formed on both ends of the remaining separator is also included in the scope of the present disclosure.

Meanwhile, according to another embodiment of the present disclosure, there is provided a method of manufacturing the unit cell for secondary battery, the method comprising the steps of:

(a) preparing an electrode plate on which a tab is formed;

(b) forming a first coating part of an organic/inorganic composite porous coating layer and a second coating part of an insulating coating layer on at least one surface of the base substrate to prepare a separator; and (c) stacking the electrode and the separator;

wherein the first coating part and the second coating part are formed by simultaneous coating.

In this case, the electrode plate may be a positive electrode plate or a negative electrode plate, and can be prepared by coating, drying, and rolling the electrode slurry on the current collector.

Since specific processes and materials are known in the art, detailed descriptions thereof are omitted herein, and the present disclosure can be applied to an electrode plate having a configuration known in the art.

Subsequently, as for the separator manufactured above, the first coating part and the second coating part may be formed separately, but it can be formed by simultaneous coating in consideration of the efficiency of manufacturing the processability and the like.

The coating method may include all conventionally known coating methods, and for example, it can be performed by a method such as die coating, inkjet printing, spray coating, blade coating, and the like.

Therefore, when forming the organic/inorganic composite porous coating layer, an insulating coating layer can also be formed, and it can be formed by a simple method, without requiring a separate process.

Specific materials of the organic/inorganic composite porous coating layer and the insulating coating layer are the same as described above.

Subsequently, the electrode and the separator may be stacked or laminated.

Further, a unit cell for secondary battery can be manufactured by containing an additional electrode plate and an additional separator therein and stacking and laminating them.

Meanwhile, according to another embodiment of the present disclosure, there is provided an electrode assembly including the unit cell for secondary battery, and a lithium secondary battery containing the electrode assembly and a lithium salt non-aqueous electrolyte.

Since the above configuration is conventionally known, a specific description thereof will be omitted herein.

Any person who has ordinary knowledge in the field to which the present disclosure belongs can make various applications and modifications within the scope of the present disclosure based on the above contents.

INDUSTRIAL APPLICABILITY

As described above, the unit cell for secondary battery according to the embodiment of the present disclosure is configured such the insulating coating layer is formed on the separator rather than the electrode, and thus has the effects of securing the battery cell safety desired by the formation of the insulating coating layer without loss of the electrode slurry that occurred while matching the alignment during coating for forming the insulating coating layer.

In addition, the insulating coating layer as a polymer coating layer is applied to the separator, whereby the adhesive force between the separators at both ends can be improved, so that the folding issue of the separator can be reduced.

The invention claimed is:

1. A unit cell for a secondary battery, comprising:

an electrode plate on which a tab is formed, and a separator, wherein the separator comprises a first coating part in which an organic/inorganic composite porous coating layer is formed on at least one surface of a base substrate, and a second coating part on which an insulating coating layer is formed, and wherein the tab is formed on one side of the electrode plate, the second coating part is formed on one end of the separator at a portion overlapping with the tab based on a formation direction of the tab, the first coating part is formed parallel to and extending along a same plane as the second coating part at the remaining portion, and the electrode is stacked on the separator so that the tab overlaps the second coating part of the separator.

2. A unit cell for a secondary battery, comprising:

an electrode plate on which a tab is formed; and a separator, wherein the separator comprises a first coating part in which an organic/inorganic composite porous coating layer is formed on at least one surface of a base substrate, and a second coating part on which an insulating coating layer is formed, and wherein the tab is formed on one side or both sides of the electrode plate, the second coating part is formed on one end of the separator at a portion overlapping with the tab based on a formation direction of the tab and at the other end of the separator corresponding thereto, the first coating part is formed parallel to the second coating part at the remaining portion, and the electrode is stacked on the separator so that the tab overlaps the second coating part at one end or both ends.

3. The unit cell for the secondary battery according to claim 1, wherein:

the electrode plate is a positive electrode plate.

4. The unit cell for the secondary battery according to claim 3, wherein:

the unit cell for the secondary battery further comprises a negative electrode plate, and the separator is interposed between the positive electrode plate and the negative electrode plate.

5. The unit cell for the secondary battery according to claim 4, wherein:

the negative electrode plate is larger in size than the positive electrode plate.

6. The unit cell for the secondary battery according to claim 4, wherein:

the unit cell for secondary battery further comprises an additional separator including a first coating part and a second coating part, and the additional separator is stacked on the other surface of the positive electrode plate or the negative electrode plate on which the separator does not face.

7. The unit cell for the secondary battery according to claim 6, wherein:

the second coating part of the separator and the second coating part of the additional separator are joined to each other.

8. The unit cell for the secondary battery according to claim 1, wherein:

the insulating coating layer is a polymer coating layer containing a PVdF-based material.

9. An electrode assembly comprising the unit cell for the secondary battery as set forth in claim 1.

10. A lithium secondary battery comprising the electrode assembly as set forth in claim 9, and a lithium salt non-aqueous electrolyte.

11. A method of manufacturing the unit cell for the secondary battery of claim 1, the method comprising the steps of:

(a) preparing the electrode plate on which the tab is formed;

(b) forming the first coating part of the organic/inorganic composite porous coating layer and the second coating part of the insulating coating layer on the at least one surface of the base substrate to prepare the separator; and (c) stacking the electrode and the separator after the preparing step (a). and the forming step (b).

12. The method of manufacturing the unit cell for secondary battery according to claim 11, wherein:

the first coating part and the second coating part are formed by simultaneous coating.

* * * * *